(12) United States Patent
Salazar et al.

(10) Patent No.: US 6,732,951 B1
(45) Date of Patent: May 11, 2004

(54) ROOF MOUNTED EVAPORATIVE COOLING SYSTEM

(76) Inventors: Pete Salazar, 3806 Castledale, Houston, TX (US) 77093; Gilbert R. Hicks, Jr., 22835 Cabanna Rd., Spring, TX (US) 77389

( * ) Notice: Subject to any disclaimer, the term of this patent is extended or adjusted under 35 U.S.C. 154(b) by 0 days.

(21) Appl. No.: 10/134,067

(22) Filed: Apr. 27, 2002

(51) Int. Cl.[7] .............................................. B05B 15/06
(52) U.S. Cl. .......................... 239/209; 239/208; 285/5; 285/61; 285/238; 169/54
(58) Field of Search ................................. 239/208, 209; 285/61–64, 5, 238–242; 169/54

(56) References Cited

U.S. PATENT DOCUMENTS

| | | | |
|---|---|---|---|
| 1,423,309 A | * 7/1922 | Curtis | 285/64 |
| 1,644,603 A | * 10/1927 | O'Neill | 169/16 |
| 1,831,880 A | 11/1931 | Pierce | |
| 4,175,703 A | 11/1979 | Valiant | |
| 4,372,493 A | 2/1983 | Smith | |
| 5,209,440 A | * 5/1993 | Walker | 248/68.1 |
| 5,732,511 A | 3/1998 | Scott | |
| 6,241,024 B1 | * 6/2001 | Haase, III | 169/16 |
| 6,450,264 B1 | * 9/2002 | Christian | 239/208 |

* cited by examiner

*Primary Examiner*—Christopher Kim
(74) *Attorney, Agent, or Firm*—Kenneth A. Roddy

(57) ABSTRACT

A roof mounted evaporative cooling system utilizing a plurality of elongate deflectors that are supported and secured a short distance above the ridge of a gable roof by a plurality of spaced apart support bracket connectors. Each support bracket connector has a central longitudinal portion with a hose barb at each end, and a vertical portion in which a spray nozzle is mounted. The support bracket connectors are joined together by a plurality of sections of flexible tubing having opposed ends engaged on the hose barb of the connectors and secured by hose clamps. Water is supplied to the connectors and adjoined sections of flexible tubing by conduit connected through a battery operated timer to an outdoor water faucet or to the cold water supply pipe in the attic of the building. In operation, the fine mist of water, under standard domestic water pressure impinges and spreads evenly along the underside of the deflectors and drips off of lateral side portions of the deflectors and runs onto the roof. The deflectors conceal the connectors and protect the fine mist against the action of heavy winds.

3 Claims, 3 Drawing Sheets

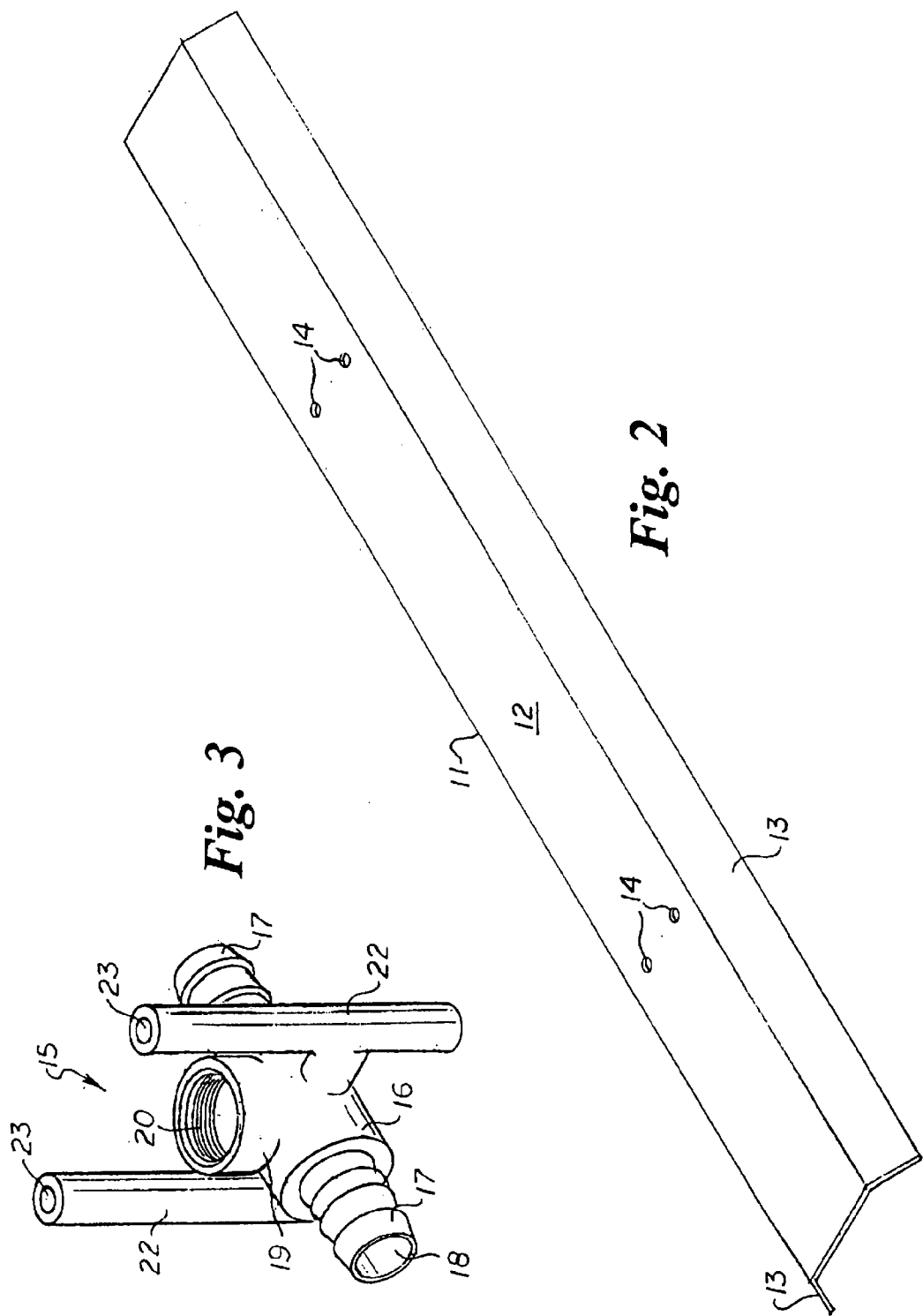

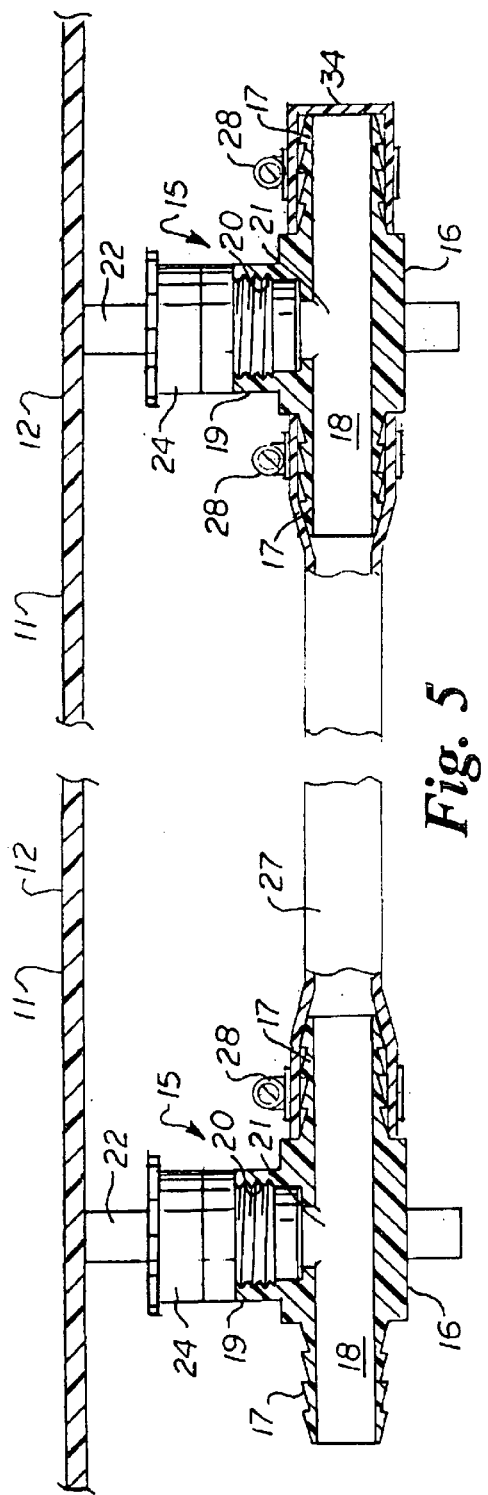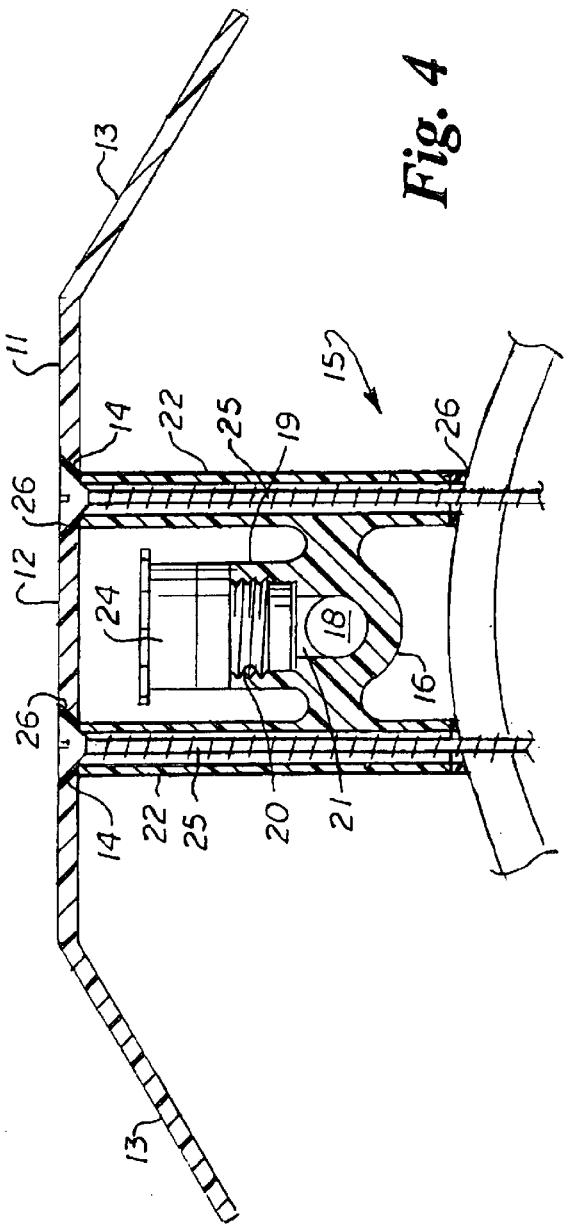

ROOF MOUNTED EVAPORATIVE COOLING SYSTEM

BACKGROUND OF THE INVENTION

1. Field of the Invention

This invention relates generally to roof mounted water spray systems, and more particularly to a roof mounted evaporative cooling system utilizing elongate deflectors supported a short distance above the ridge of a gable roof by a plurality of support bracket connectors adjoined in spaced relation by flexible tubing and nozzles mounted in the connectors that produce a fine water mist which spreads evenly along the underside of the deflectors and drips off the sides of the deflectors and onto the roof to wet the roof and provide to evaporative cooling.

2. Brief Description of the Prior Art

It is well known that a large portion of the heat load placed on a building is due to the sun heating the roof. For example, on a typical day when the outside temperature is 70° F., the surface of a roof can reach temperatures in excess of 175° F. This heat load is transmitted into the attic and into the living quarters of the building. A great deal of the cost to run an air conditioning unit can be attributed to just overcoming the heat load due to the elevated temperature of the roof and attic.

There are several patents that disclose roof mounted fire protection and evaporative cooling systems of various constructions that disperse water onto the roof of a building.

Pierce, U.S. Pat. No. 1,831,880 discloses a fire protective and roof cooling device comprising an inverted V-shaped sheet metal saddle board formed in sections with a longitudinal perforated conduit rigidly mounted on each saddle board section by a series of brackets. The conduit sections have externally threaded ends that are joined together by a threaded coupling. A second inverted V-shaped sheet metal cover, similar to the saddle board may be secured to the brackets above the conduit sections to conceal the conduit and protect the perforations against the action of heavy wind.

Valiant, U.S. Pat. No. 4,175,703 discloses a spray cooling system for a gable roof having inclined first and second roof sections that intersect at a roof summit. The spray cooling system comprises a conduit mounted atop the first roof section adjacent the roof summit adapted to be connected to a supply of liquid coolant. The conduit is mounted atop the first roof section by a series of eye-bolts and is formed with a first series of ports formed in one side thereof through which liquid coolant may be sprayed upon the first roof section, and a second series of ports through which liquid coolant may be directed over the roof summit and sprayed upon the second roof section.

Smith, U.S. Pat. No. 4,372,493 discloses a water distributing apparatus for uniformly wetting a roof to provide evaporative cooling. The apparatus includes a generally horizontal water conduit supported on a roof, a flexible tube attached to an upper surface of the conduit and a directional nozzle attached to a second end of the flexible tube. The directional nozzle has an outlet angularly displaced from the longitudinal axis of the second end of the flexible tube to provide rapid generally random movement of the nozzle about its point of attachment to the water supply conduit. In a preferred embodiment the conduit includes spaced apart conduit tee components having upstanding branches into which are fitted plugs supporting connector fittings for the flexible tubes. An upstanding sleeve surrounds the tube connector fitting and is operable to engage the flexible tube to minimize snagging of the directional nozzle under the edges of the roof shingles and control the flailing action of the tubes.

Scott, U.S. Pat. No. 5,732,511 discloses a roof mounted fire protection system comprising a horizontal roof pipe mounted on the apex of a pitched roof, a vertical side pipe affixed to the side wall of the house having an upper end connected to the horizontal pipe, a plurality of upwardly directed sprinkler heads connected to the horizontal pipe, each sprinkler head formed in a generally conical configuration, a pump having an intake port connected to a water source and an output port connected to the lower end of the vertical pipe, and an activation operatively coupled to the pump to enabling a user to activate the pump to supply water to the sprinkler heads when required.

The prior art roof mounted fire protection systems are not particularly suitable for use as evaporative cooling systems because they are primarily designed to provide a large volume or excessive amount of water onto the roof in a very short period of time, and would expensive and wasteful of water if used on a daily or regular basis.

Prior art roof cooling systems that utilize an elongate perforated conduit mounted atop the roof and those that utilize conventional lawn sprinkler mechanisms that discharge streams or jets of water through the air onto the roof tend to distribute much more water than is actually needed for efficient evaporative cooling and are inefficient and wasteful of water, particular during windy weather conditions. If too much water is applied on the roof surface without time to permit evaporation, the effects of evaporation can actually be reversed. If too little water is applied, the roof temperatures can rise above the desired limit.

Another problem with prior art roof cooling systems that utilize an elongate perforated conduit mounted atop the roof and those that utilize uncovered sprinklers and nozzles is that they are visually unattractive and detract from the aesthetics of the building or dwelling.

The present invention is distinguished over the prior art in general, and these patents in particular by a roof mounted evaporative cooling system comprising a plurality of elongate deflectors that are supported and secured a short distance above the ridge of a gable roof by a plurality of spaced apart support bracket connectors. Each support bracket connector has a central longitudinal portion with a hose barb at each end, and a vertical portion in which a spray nozzle is mounted. The support bracket connectors are joined together by a plurality of sections of flexible tubing having opposed ends engaged on the hose barb of the connectors and secured by hose clamps. Water is supplied to the connectors and adjoined sections of flexible tubing by conduit connected through a battery operated timer to an outdoor water faucet or to the cold water supply pipe in the attic of the building. In operation, the fine mist of water, under standard domestic water pressure impinges and spreads evenly along the underside of the deflectors and drips off of lateral side portions of the deflectors and runs onto the roof. The deflectors conceal the connectors and protect the fine mist against the action of heavy winds.

SUMMARY OF THE INVENTION

It is therefore an object of the present invention to provide a roof mounted evaporative cooling system that will significantly reduce the heat load transmitted into the attic and into the living quarters of the building.

It is another object of this invention to provide a roof mounted evaporative cooling system that will significantly reduce cost of operating an air conditioning system to cool a building by reducing the heat load attributed to elevated temperatures of the roof and attic of the building.

Another object of this invention is to provide a roof mounted evaporative cooling system wherein the components of the system are hidden from view and will not detract from the aesthetics of the building or dwelling on which it is installed.

Another object of this invention is to provide a roof mounted evaporative cooling system that provides uniform roof wetting with minimum water usage.

Another object of this invention is to provide a roof mounted evaporative cooling system that does not require a pump and operates on domestic water supply pressure.

Another object of this invention is to provide a roof mounted evaporative cooling system that can be programmed to operate automatically during selected time periods.

Another object of this invention is to provide a roof mounted evaporative cooling system that produces a fine mist and minimum exposure of the mist to wind.

A further object of this invention is to provide a roof mounted evaporative cooling system that is easily and quickly installed and assembled.

A still further object of this invention is to provide a roof mounted evaporative cooling system that is simple in construction, inexpensive to manufacture, and rugged and reliable in operation.

Other objects of the invention will become apparent from time to time throughout the specification and claims as hereinafter related.

The above noted objects and other objects of the invention are accomplished by a roof mounted evaporative cooling system comprising a plurality of elongate deflectors that are supported and secured a short distance above the ridge of a gable roof by a plurality of spaced apart support bracket connectors. Each support bracket connector has a central longitudinal portion with a hose barb at each end, and a vertical portion in which a spray nozzle is mounted. The support bracket connectors are joined together by a plurality of sections of flexible tubing having opposed ends engaged on the hose barb of the connectors and secured by hose clamps. Water is supplied to the connectors and adjoined sections of flexible tubing by conduit connected through a battery operated timer to an outdoor water faucet or to the cold water supply pipe in the attic of the building. In operation, the fine mist of water, under standard domestic water pressure impinges and spreads evenly along the underside of the deflectors and drips off of lateral side portions of the deflectors and runs onto the roof. The deflectors conceal the connectors and protect the fine mist against the action of heavy winds.

BRIEF DESCRIPTION OF THE DRAWINGS

FIG. 2 is a perspective view of a deflector section of the spray cooling system.

FIG. 3 is a perspective view of a support bracket connector of the spray cooling system.

FIG. 4 is a transverse cross sectional view through a support bracket connector and deflector section mounted on the roof with a nozzle installed in the connector.

FIG. 5 is a longitudinal cross section through a pair of adjoined support bracket connectors.

DESCRIPTION OF THE PREFERRED EMBODIMENT

Figure 1:
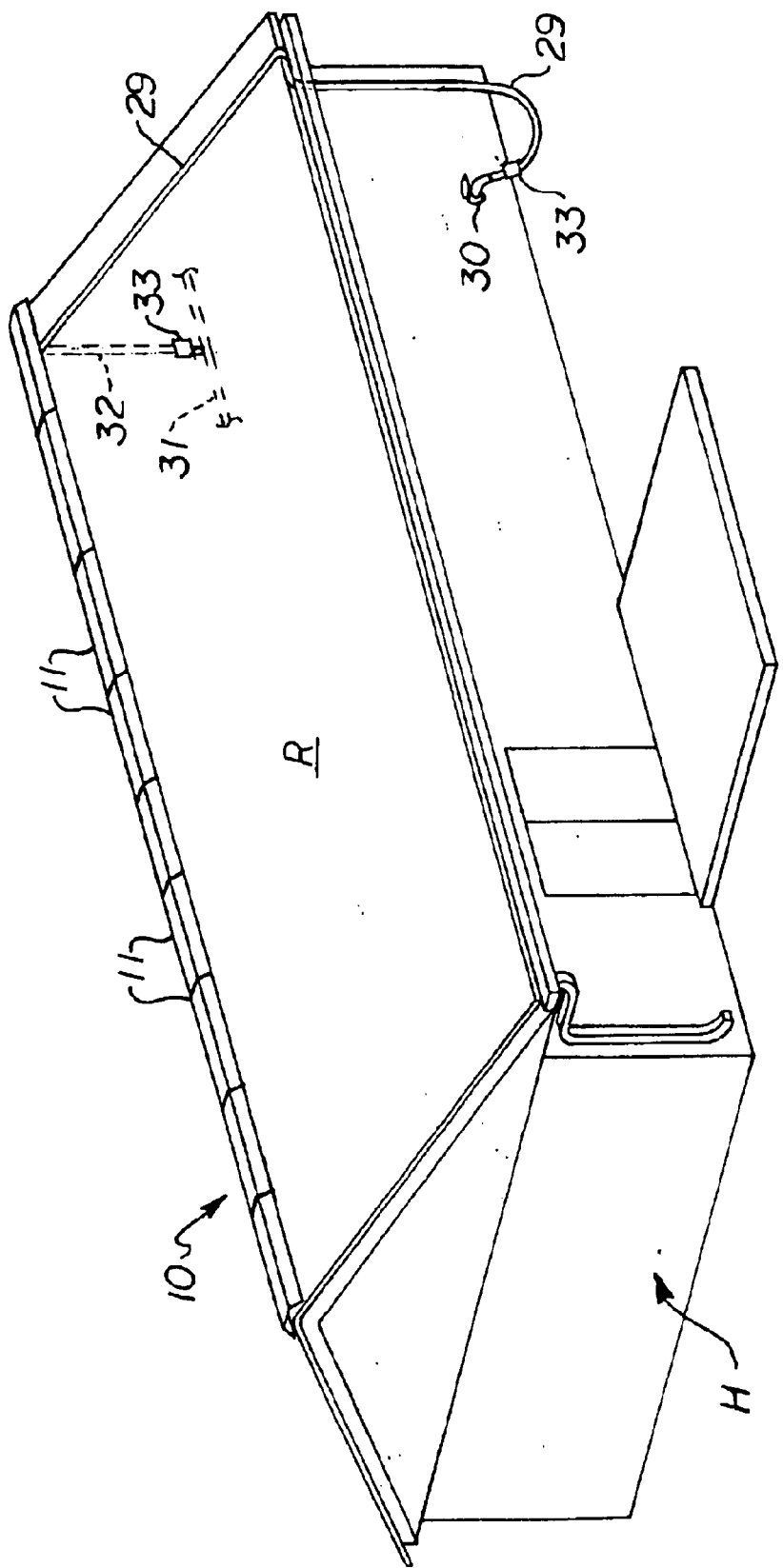
FIG. 1 is a perspective view of a house having a gable roof upon which a spray cooling system in accordance with the present invention is mounted.

Referring to the drawings by numerals of reference, there is shown in FIG. 1, a house H having a gable roof R upon which a spray cooling system 10 in accordance with the present invention is mounted. The spray cooling system 10 includes a plurality of elongate deflector members 11, as shown in FIG. 2, that are supported and secured a short distance above the ridge of the roof by a plurality of support bracket connectors 15, as shown in FIG. 3. FIGS. 4 and 5 show, in cross sectional view, how the support bracket connectors 15 and deflector members 11 are assembled and mounted on the roof.

As best seen in FIGS. 3, 4 and 5, each support bracket connector 15 is a unitary member formed of molded plastic material, having a central longitudinal portion 16 with a hose barb 17 at each end, and a central longitudinal bore 18 extending therethrough. A cylindrical vertical portion 19 extends a short distance upwardly from the longitudinal portion 16 and has internal threads 20 at its upper end and a central bore 21 in fluid communication with the longitudinal bore 18. A pair of tubular vertical legs 22 are integrally joined to laterally opposed sides of the central longitudinal portion 16 and each has a vertical bore 23 extending therethrough.

As shown in FIGS. 4 and 5, a spray nozzle 24 is threadedly engaged in the internal threads 20 of the vertical portion 19 of each support bracket connector 15. A suitable commercially available spray nozzle for this purpose is a Model 53320 nozzle manufactured by The Toro Company, of Bloomington, Minn. Other similar commercially available spray nozzles may also be used. In a preferred embodiment, the nozzles 24 are adjusted so as to disperse water in a fine mist.

As shown in FIGS. 2 and 4, each deflector section 11 is formed of suitable weather resistant plastic material and has a central flat horizontal portion 12 and lateral side portions 13 that extend angularly downward on each side of the horizontal portion. In a preferred embodiment, each deflector section 11 is approximately 2' in length, the horizontal portion 12 is approximately 4" wide, and the lateral side portions 13 are approximately 2" wide. A pair of laterally spaced apertures 14 are formed a distance inwardly from each end with their lateral spacing corresponding to the lateral spacing of the vertical bores 23 of the tubular vertical legs 22 of the support bracket connectors 15.

The support bracket connectors 15 and elongate deflector sections 11 are secured to the apex or ridge of the roof by installing fasteners, such as wood screws 25, through the apertures 14 of the deflector sections 11 and vertical bores 23 of the tubular vertical legs 22 of the support bracket connectors, and into the roofing material. The outer ends of the deflector sections may be abutted in end to end relation, or may be overlapped. Weather sealing washers 26 are installed between the head of the screw 25 and the deflector 11 and between the bottom end of the vertical legs 22 of the support bracket connectors 15 and the outer surface of the roofing material to prevent water from leaking around the screw and into the roof.

The support bracket connectors 15 are joined together by a plurality of sections of flexible tubing 27 having opposed ends engaged on the hose barbs 17 of the longitudinally spaced connectors. The ends of each flexible tubing section 27 are secured on the hose barbs 17 by conventional hose clamps 28.

As shown somewhat schematically in FIG. 1, the support bracket connectors and adjoined sections of flexible tubing are connected to the cold water supply of the building or house. This may be accomplished by connecting one end of an elongate section of flexible tubing 29 to the outer facing hose barb 17 of an outermost connector, and its other end to the nearest outdoor water faucet 30.

Alternatively, the support bracket connectors and adjoined sections of flexible tubing may be connected to the cold water supply pipe 31 in the attic of the building or house. This may be accomplished by providing a tee fitting in the cold water supply pipe and connecting one end of an elongate section of flexible tubing 32 to the tee fitting and its other end to the outer facing hose barb of an outermost connector, or to a second tee fitting installed in the section of tubing between two longitudinally spaced connectors.

Preferably, in either installation, a conventional battery powered timer 33 is connected between the cold water supply and the elongate section of flexible tubing that is connected to the support bracket connectors and adjoined sections of flexible tubing. The battery powered timer 33 may be set to supply water to the to support bracket connectors and adjoined sections of flexible tubing during selected desirable time periods. A suitable commercially available battery powered timer for this purpose is a Model 5800 manufactured by Nelson Company, of Peoria, Ill.

Referring again to FIG. 5, the outer facing hose barb 17 of the outermost connector (s) 15 that is/are not connected to the water supply is plugged or sealed off by an end cap 34. In a preferred embodiment, all of the flexible tubing which is used in the system is 3/8" I.D.×1/2" O.D. to conserve water and to facilitate maximum and consistent water pressure.

When water, under standard home water pressure of from about 48 to 60 psi, is supplied to the support bracket connectors 15 and adjoined sections of flexible tubing 27, the water is dispersed through the longitudinally spaced spray nozzles 24 as a fine mist. The mist impinges and spreads evenly along the underside and lateral side portions 13 of the deflector sections 11 and drips off of the lower ends of the lateral side portions and runs onto the slopped roof. Thus, water is introduced substantially evenly along the apex of the roof and runs down the slopped roof. The deflector sections 11 protect the fine mist against the action of heavy winds and conceal the connectors 15 and tubing 27.

As the water runs onto the roof, the roof becomes wet and the water evaporates, and in so doing, absorbs large quantities of heat. For example, a gallon of water at 100° F. will evaporate and absorb approximately 8500 Btu's.

While this invention has been described fully and completely with special emphasis upon preferred embodiments, it should be understood that within the scope of the appended claims the invention may be practiced otherwise than as specifically described herein.

What is claimed is:

1. A roof mounted evaporative spray cooling system, comprising:

a plurality of support bracket connectors adapted to be secured along the ridge of a gable roof of a building in longitudinally spaced apart relation;

each support bracket connector having a central longitudinal portion with a hose barb at each end, a central longitudinal bore extending therethrough from end to end, a central vertical portion having a vertical bore in fluid communication with said longitudinal bore, and a pair of tubular vertical legs disposed on laterally opposed sides of said central longitudinal portion, respectively, each having a vertical bore extending therethrough;

a spray nozzle mounted in said central vertical portion vertical bore adapted to disperse water in a fine mist;

a plurality of sections of flexible tubing each having opposed ends secured on a respective hose barb of said longitudinally spaced apart support bracket connectors adjoining them together;

water supply conduit means connected at a first end with said adjoined sections of flexible tubing and support bracket connectors, and at a second end to a source of water under pressure; and a plurality of elongate deflector members each having a pair of laterally spaced apertures disposed a distance inwardly from opposed ends with their lateral spacing corresponding to the lateral spacing of said vertical bores of said tubular vertical legs of said support bracket connector;

said support bracket connectors and said elongate deflector members secured to the ridge of the gable roof by fasteners extending through said laterally spaced apertures and said vertical bores of said tubular vertical legs of said support bracket connectors; and said deflector members supported on said support bracket connectors a short distance above the ridge of the gable roof and said nozzles, said deflector members disposed in end to end relation and having lateral sides that extend angularly outward and downward above the surface of the roof; wherein water under pressure is conducted through said adjoined sections of flexible tubing and said support bracket connectors and dispersed by said nozzles as a fine mist which impinges and spreads evenly along an underside of said deflector members, drips off of said lateral sides, and runs onto the roof, and said deflector members protect the fine mist against the action of heavy winds.

2. The roof mounted evaporative spray cooling system according to claim 1, wherein timing means connected between said source of water and said water supply conduit means second end for supplying water under pressure through to said support bracket connectors and adjoined sections of flexible tubing during selected time periods.

3. The support bracket connector according to claim 1, wherein said support bracket connector is a member formed of molded plastic material.

\* \* \* \* \*